(12) United States Patent
Akiyama

(10) Patent No.: US 9,170,372 B2
(45) Date of Patent: Oct. 27, 2015

(54) FERRULE TRANSFER METHOD AND FERRULE HOLDER

(71) Applicant: Furukawa Electric Co., Ltd., Tokyo (JP)

(72) Inventor: Tomohiro Akiyama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 13/925,334

(22) Filed: Jun. 24, 2013

(65) Prior Publication Data

US 2013/0279863 A1 Oct. 24, 2013

Related U.S. Application Data

(60) Division of application No. 12/763,874, filed on Apr. 20, 2010, now Pat. No. 8,496,388, which is a continuation of application No. 12/267,972, filed on Nov. 10, 2008, now Pat. No. 7,726,886, which is a division of application No. 11/757,711, filed on Jun. 4, 2007, now Pat. No. 7,467,899.

(30) Foreign Application Priority Data

Jan. 31, 2007 (JP) .................................. 2007-021298

(51) Int. Cl.
*G02B 6/255* (2006.01)
(52) U.S. Cl.
CPC ............ *G02B 6/2553* (2013.01); *G02B 6/2551* (2013.01); *G02B 6/2558* (2013.01)

(58) Field of Classification Search
USPC ................................. 385/78, 95–99, 134–136
See application file for complete search history.

(56) References Cited

U.S. PATENT DOCUMENTS

| | | | |
|---|---|---|---|
| 4,931,120 | A | 6/1990 | Christoff |
| 5,042,902 | A | 8/1991 | Huebscher et al. |
| 5,469,522 | A | 11/1995 | Fan |
| 5,828,806 | A | 10/1998 | Grois et al. |

(Continued)

FOREIGN PATENT DOCUMENTS

| | | | |
|---|---|---|---|
| CN | 86104655 A | | 12/1986 |
| CN | 1152132 A | | 6/1997 |

(Continued)

OTHER PUBLICATIONS

Office Action issued Jan. 31, 2013, in Chinese Patent Application No. 2013012801073290 (with English language translation).

(Continued)

*Primary Examiner* — Daniel Petkovsek
(74) *Attorney, Agent, or Firm* — Oblon, McClelland, Maier & Neustadt, L.L.P.

(57) ABSTRACT

A method of making a fusion-spliced optical fiber includes holding a ferrule in one end of a holding element, said holding element having a stem extending from the other end thereof, said ferrule disposed around an optical fiber segment, said optical fiber segment having an exposed end that extends from said ferrule; receiving said holding element in a ferrule holding element of a fusion-splicing device; fusion-splicing said exposed end of said optical fiber segment to an end of another optical fiber to form a spliced portion; and transferring said spliced portion by supporting at least said stem.

10 Claims, 11 Drawing Sheets

(56) References Cited

U.S. PATENT DOCUMENTS

| | | | |
|---|---|---|---|
| 5,859,944 | A | 1/1999 | Inoue et al. |
| 6,816,661 | B1 | 11/2004 | Barnes et al. |
| 7,341,383 | B2 | 3/2008 | Droege et al. |
| 7,412,145 | B2 | 8/2008 | Honma et al. |
| 7,467,899 | B2 | 12/2008 | Akiyama |
| 7,934,874 | B2 | 5/2011 | Honma et al. |
| 8,496,388 | B2 * | 7/2013 | Akiyama ............ 385/96 |
| 2004/0081408 | A1 | 4/2004 | Chen et al. |
| 2005/0013555 | A1 | 1/2005 | Nishie et al. |
| 2005/0213897 | A1 | 9/2005 | Palmer et al. |
| 2005/0238292 | A1 | 10/2005 | Barnes et al. |
| 2009/0238523 | A1 | 9/2009 | Honma et al. |

FOREIGN PATENT DOCUMENTS

| | | | |
|---|---|---|---|
| CN | 1430076 | A | 7/2003 |
| EP | 0836104 | A1 | 4/1998 |
| JP | 62-149655 | | 7/1987 |
| JP | 64-032210 | | 2/1989 |
| JP | 64-54004 | | 4/1989 |
| JP | 03-054508 | | 3/1991 |
| JP | 06-109946 | | 4/1994 |
| JP | 06-118281 | | 4/1994 |
| JP | 09-297244 | | 11/1997 |
| JP | 10-206688 | | 8/1998 |
| JP | 10-319272 | | 12/1998 |
| JP | 11-142686 | | 5/1999 |
| JP | 11-142687 | | 5/1999 |
| JP | 11-160563 | | 6/1999 |
| JP | 2000-206372 | A | 7/2000 |
| JP | 2000-347068 | | 12/2000 |
| JP | 2001-013373 | | 1/2001 |
| JP | 3077678 | | 2/2001 |
| JP | 2001-201664 | | 7/2001 |
| JP | 2002-82257 | | 3/2002 |
| JP | 2004-317945 | | 11/2004 |
| JP | 2005-3922 | A | 1/2005 |
| JP | 2005-338517 | A | 12/2005 |

OTHER PUBLICATIONS

Combined Chinese Office Action and Search Report issued Dec. 25, 2013 in Patent Application No. 201210260611.0 with English Translation of Category of Cited Documents.

Combined Chinese Office Action and Search Report issued Dec. 31, 2013 in Patent Application No. 201210260861.4 with English Translation of Category of Cited Documents.

Office Action issued on Jul. 9, 2014 in Chinese Patent Application No. 201210260189.9, along with its English translation.

* cited by examiner

FIG.19 --BACKGROUND ART--
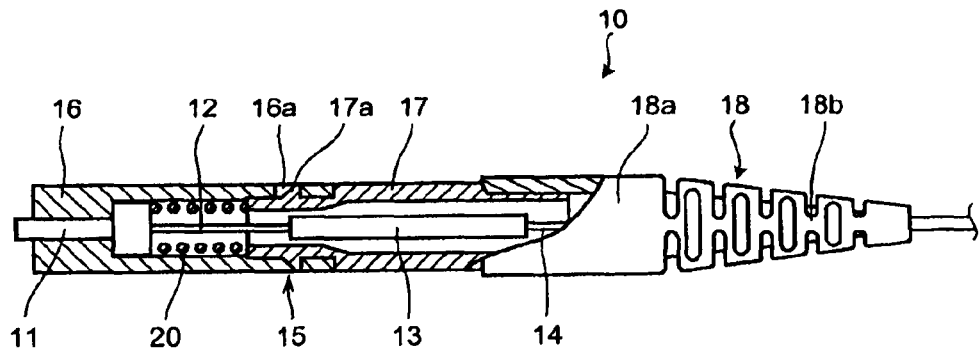
FIG.20 --BACKGROUND ART--
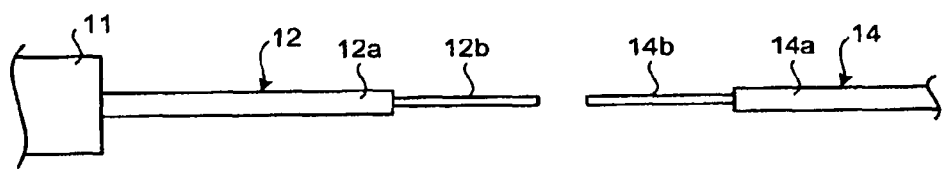
FIG.21 --BACKGROUND ART--
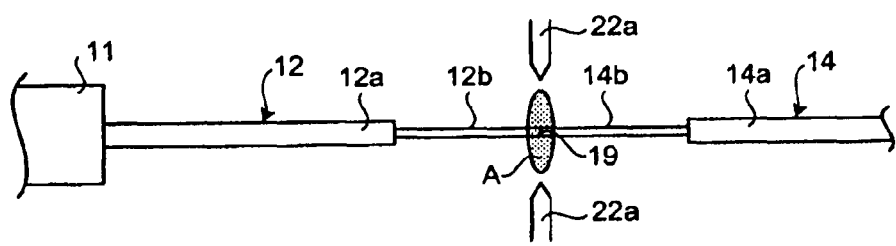
FIG.22 --BACKGROUND ART--
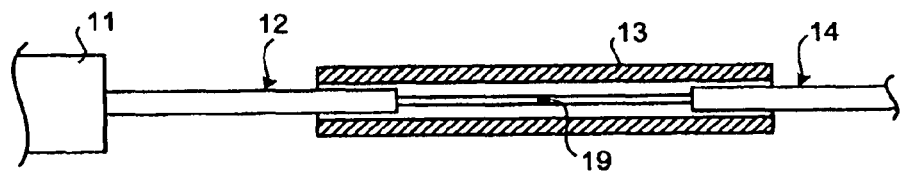

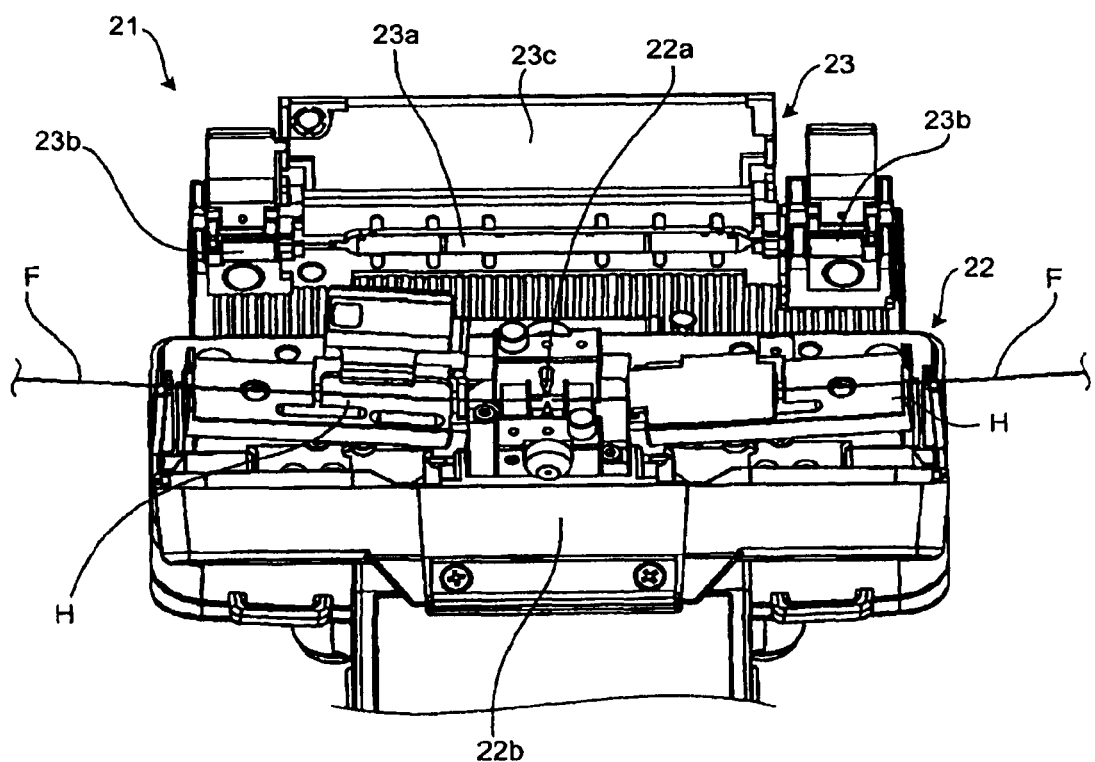
FIG.23 —BACKGROUND ART—

FIG.24   --BACKGROUND ART--
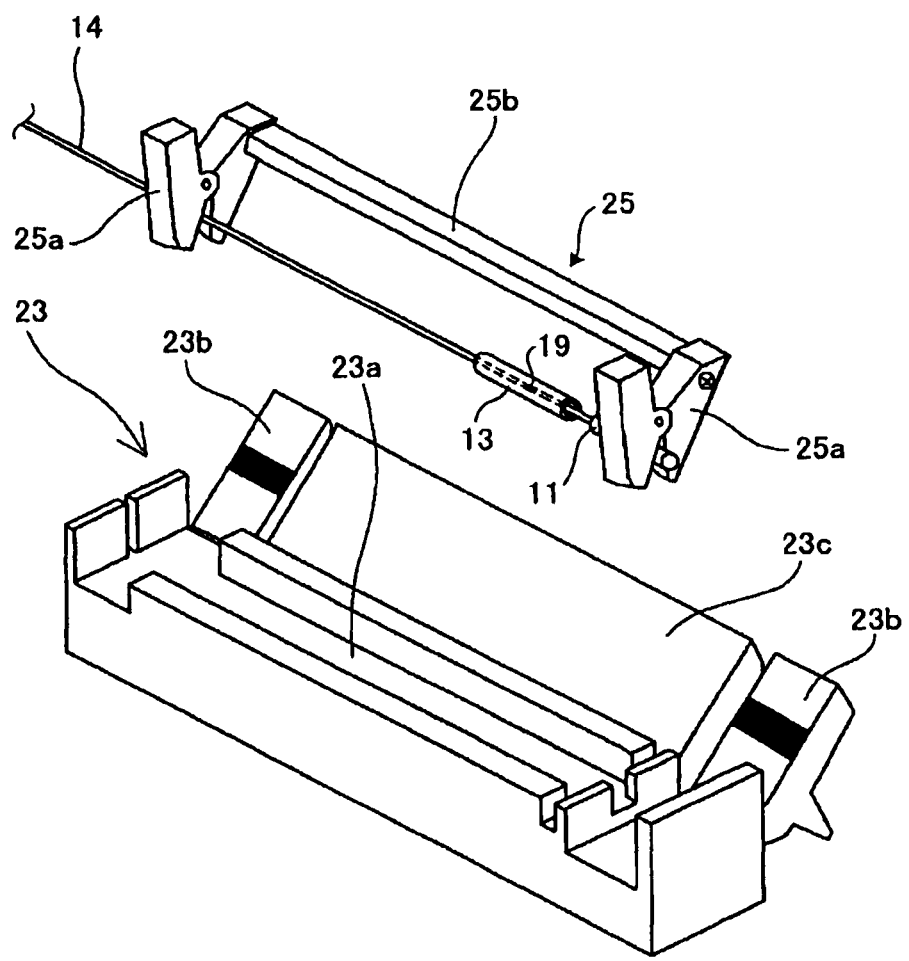

FERRULE TRANSFER METHOD AND FERRULE HOLDER

CROSS-REFERENCE TO RELATED APPLICATIONS

This application is a divisional of U.S. application Ser. No. 12/763,874 (now U.S. Pat. No. 8,496,388), filed Apr. 20, 2010 which is a continuation of U.S. application Ser. No. 12/267,972 (now U.S. Pat. No. 7,726,886), filed Nov. 10, 2008, and is a divisional of U.S. application Ser. No. 11/757,711 (now U.S. Pat. No. 7,467,899), filed Jun. 4, 2007, the entire contents of which are incorporated herein by reference.

U.S. application Ser. No. 11/757,711 claims priority to Japanese application No. 2007-021298, filed Jan. 31, 2007.

BACKGROUND OF THE INVENTION

1. Field of the Invention

The present invention relates to a ferrule transfer method of transferring a ferrule with a built-in optical fiber that is fusion-spliced with an optical fiber to a fusion-spliced-portion reinforcing device and a ferrule holder for holding the ferrule.

2. Description of the Related Art

Recently, with the prevalence of FTTH (Fiber To The Home) and the like, an optical communication network is widely used at general households. Along with this condition, various splicing methods of assembling an optical connector without performing a polishing step and splicing optical fibers are employed at a splicing site.

As the optical connector, there is known a mechanical optical connector in which one end of a built-in optical fiber matches a splicing end of the ferrule and the other end of the built-in optical fiber is protruded from the other end of the ferrule where a mechanical holding unit is provided (see, for example, Japanese Patent Application Laid-open No. H10-206688, Japanese Patent Application Laid-open No. H11-142686, Japanese Patent Application Laid-open No. H11-142687, Japanese Patent Application Laid-open No. H11-160563, and Japanese Patent Application Laid-open No. 2000-347068). In the mechanical optical connector, the other end of the built-in optical fiber and one end of another optical fiber are mechanically held to splice them in such a manner that their axis centers match each other so that an optical connector can be provided on the one end of another optical fiber.

In these days, an optical connector is provided in which a built-in optical fiber and another optical fiber are fusion-spliced to enhance a long-time reliability (see, for example, Japanese Patent Application Laid-open No. 2002-82257).

FIG. 19 is a schematic partial section view of a conventional optical connector 10 disclosed in Japanese Patent Application Laid-open No. 2002-82257. The optical connector 10 includes a ferrule 11, a built-in optical fiber 12, a housing 15, and a coil spring 20, and is fusion-spliced with an optical fiber core 14, with a fusion-spliced portion reinforced with a reinforcing body 13.

The housing 15 includes a plug housing 16, a stopper ring 17, and a boot 18. The plug housing 16 and the stopper ring 17 are coupled by engaging an engagement hole 16a and an engagement protrusion 17a. The boot 18 is attached to the stopper ring 17 that constitutes a rear portion of the housing 15. The boot 18 includes an attaching portion 18a and a bending portion 18b. The coil spring 20 is placed between the ferrule 11 and the stopper ring 17, holding the ferrule 11 in a movable manner in an axis direction.

The built-in optical fiber 12 is formed by cutting in advance an appropriate optical fiber by a predetermined length at a manufacturing factory, and inserting and fixing it in the ferrule 11. One end of the built-in optical fiber 12 and a splicing end of the ferrule 11 are polishing-processed in advance, and are processed not to cause splicing loss with another optical connector spliced. On the other hand, removal of a coating and end processing for fusion splicing are required for the other end of the built-in optical fiber 12 that protrudes backward of the ferrule 11, which are generally performed in advance at a manufacturing factory and the like.

Removal of a coating and end processing with regard to the optical fiber core 14 to be spliced to the optical connector 10 are performed at the splicing site. Machine tools for the processing are provided at the splicing site.

FIGS. 20 to 22 depict an operation of fusion splicing between the built-in optical fiber attached by insertion into the ferrule 11 and the optical fiber core 14. The operation of fusion splicing is performed at the splicing site. Prior to the fusion splicing, as shown in FIG. 20, at the end of the built-in optical fiber 12 that is to be fusion-spliced, a coating 12a is removed so that a bare optical fiber portion 12b is exposed in advance at a factory as described above. In addition, at an end of the optical fiber core 14, a coating 14a is removed so that a bare optical fiber portion 14b is exposed. Then, the bare optical fiber portions 12b and 14b are placed at a fusion-splicing device by a holder that holds them, their centers are aligned on a V-shaped groove of the holder, and the bare optical fiber portions 12b and 14b are clamped. Then, as shown in FIG. 21, an electric discharge is applied to them through an arc discharge A from discharge electrodes 22a to heat them for fusion splicing, thereby forming a fusion-spliced portion 19. Mechanical strength of the fusion-spliced portion 19 is degraded because of removed coating so that the fusion-spliced portion 19 is transferred to a later-described fusion-spliced-portion reinforcing device. Then, as shown in FIG. 22, the fusion-spliced portion 19 is covered by the reinforcing body 13.

The reinforcing body 13 is a heat-shrinkable tube that includes a reinforcing member such as metal and thermoplastic resin. The fusion-spliced portion 19 is covered by the reinforcing body 13 and is transferred to the fusion-spliced-portion reinforcing device. The reinforcing body 13 is heated and contracted so that it covers the fusion-spliced portion 19. Besides using the reinforcing body 13 as a means of protecting the fusion-spliced portion, a recoating method of coating the fusion-spliced portion with a UV-curing resin and hardening the UV-curing resin to form a coating layer is also used.

FIG. 23 is a view of an example of a main unit of a conventional fusion-splicing device 21 that fusion-splices optical fibers. It is indicated that a fusion-splicing operation unit 22 is arranged at the center and a fusion-spliced-portion reinforcing device 23 is arranged above the fusion-splicing operation unit 22. Optical fiber holders H that causes optical fibers F to face each other on their ends to arrange and fix them are arranged both sides of the fusion-splicing operation unit 22, and the discharge electrodes 22a to cause the arc discharge are arranged at its center. The fusion-spliced-portion reinforcing device 23 includes a long heating chamber 23a that extends laterally in a straight line and holders 23b that are arranged at both ends of the heating chamber 23a and that give tension to fusion-spliced optical fibers and hold optical fibers F. A reference sign 22b is a lid that covers the fusion-splicing operation unit 22 and a reference sign 23c is a lid that covers the fusion-spliced-portion reinforcing device 23.

When the built-in optical fiber 12 fitted into the ferrule 11 and the optical fiber core 14 are fusion-spliced by the fusion-splicing device 21, one of optical fiber holders is replaced with a ferrule holder.

To attach a reinforcing body to the fusion-spliced portion of the ferrule in which the optical fiber and the built-in optical fiber are fusion-spliced and to give a mechanical protection as described above, it is necessary to transfer the ferrule from the fusion-splicing operation unit of the fusion-splicing device to the fusion-spliced-portion reinforcing device. However, because an optical fiber is not attached at the splicing end of the ferrule, it is impossible to hold and transfer each of optical fibers as in a case of a conventional fusion-splicing of optical fibers. For this reason, as shown in FIG. 24, it is considered that the ferrule 11 and the optical fiber core 14 are pinched by a pinching device 25 that includes pinching units 25a, 25a having a shape like a clothespin and are transferred from the fusion-splicing operation unit 22 to the heating chamber 23a of the fusion-spliced-portion reinforcing device 23. The pinching device 25 in which the pinching units 25a, 25a are coupled by a rod-shaped coupling member 25b having a predetermined length to maintain a predetermined distance therebetween is arranged and is constituted not to give a tension to the fusion-spliced portion when transferring the ferrule and the optical fiber.

However, to accommodate the fusion-spliced portion 19 and the reinforcing body 13 in the heating chamber 23a using the method of pinching the ferrule 11 and the like by the pinching device 25 and transferring them, because the heating chamber 23a has a narrow insertion slot, the pinching device 25 should be reduced in size to be accommodated in the heating chamber 23a while the pinching device 25 pinches the ferrule 11 and the like, or the reinforcing body 13 and the ferrule 11 have to be fallen in the heating chamber 23a by stopping pinching the ferrule 11 above the heating chamber 23a. However, when accommodating the ferrule 11 by use of the small pinching device 25 in the heating chamber 23a, it is impossible to close the lid 23c of the fusion-spliced-portion reinforcing device 23. This makes it impossible to stably contract the reinforcing body 13 like a heat-shrinkable tube. Alternatively, a method can be considered that an equivalent for a lid is arranged around the pinching device 25 and the equivalent covers the heating chamber 23a. However, the method causes problems of a poor workability, a higher price because of a higher component count, and the like. Furthermore, the method of falling the reinforcing body 13 and the ferrule 11 from above the fusion-spliced-portion reinforcing device 23 has problems of a possibility of cutting the fusion-spliced portion 19 due to an impulse of falling, being unable to contract the heat-shrinkable tube in a good shape because fusion-spliced optical fibers cannot be straightly held, and the like.

SUMMARY OF THE INVENTION

It is an object of the present invention to at least partially solve the problems in the conventional technology.

A ferrule transfer method according to one aspect of the present invention is for placing a ferrule in which one end of a built-in optical fiber matches a splicing end surface and other end of the built-in optical fiber is protruded from an end portion opposite to the splicing end surface and one end of a splicing optical fiber to be spliced to the built-in optical fiber at a fusion-splicing operation unit of a fusion-splicing device, fusion splicing the other end of the built-in optical fiber with the one end of the splicing optical fiber, and then transferring the ferrule to a fusion-spliced-portion reinforcing device. The ferrule transfer method includes holding the ferrule by inserting a cylindrical portion of the ferrule into a holding unit of a ferrule holder from the splicing end surface; and transferring the ferrule while holding a stem extended on an opposite side of the holding unit of the ferrule holder and the splicing optical fiber.

A ferrule holder according to another aspect of the present invention includes a holding unit into which a cylindrical portion of a ferrule is inserted from a splicing end surface of the ferrule and by which the ferrule is held; and a stem that is extended on an opposite side of the holding unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a schematic partial section view of a conventional optical connector.

FIG. 20 is a schematic diagram illustrating an operation of fusion splicing between a built-in optical fiber fitted by insertion into a ferrule and an optical fiber.

FIG. 21 is a schematic diagram illustrating the operation of fusion splicing between the built-in optical fiber fitted by insertion into the ferrule and the optical fiber.

FIG. 22 is a schematic diagram illustrating the operation of fusion splicing between the built-in optical fiber fitted by insertion into the ferrule and the optical fiber.

FIG. 23 is a view of an example of a main unit of a conventional fusion-splicing device that fusion-splices optical fibers.

FIG. 24 is a view of an example of a pinching device that transfers the ferrule.

DETAILED DESCRIPTION OF THE PREFERRED EMBODIMENTS

Exemplary embodiments of a ferrule transfer method and a ferrule holder according to the present invention are explained in detail below with reference to FIGS. 1 to 18. The present invention is not limited to the embodiments and it is possible to modify the embodiments in various manners within a scope not departing from the gist of the present invention.

First Embodiment

Figure 1:
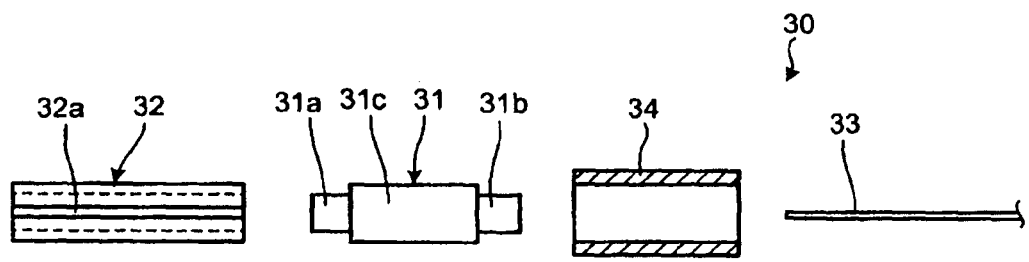
FIG. 1 is a schematic exploded view of a ferrule holder according to a first embodiment of the present invention.
Figure 2:
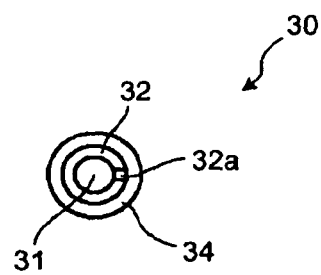
FIG. 2 is a schematic front view of the ferrule holder according to the first embodiment of the present invention.
Figure 3:
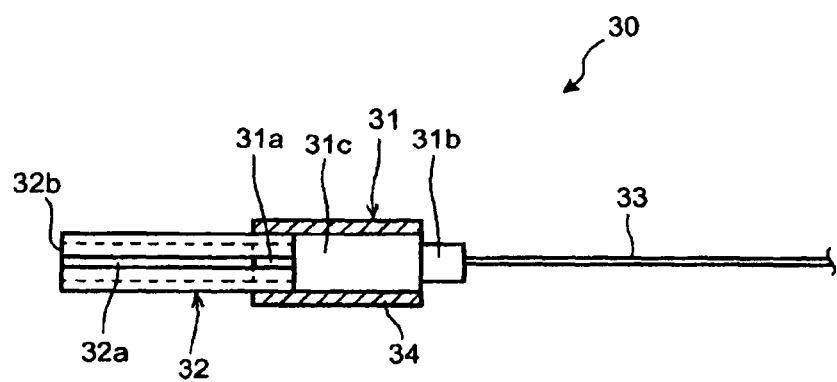
FIG. 3 is a schematic partial section side view of the ferrule holder according to the first embodiment of the present invention.

An explanation is first given about a ferrule holder according to a first embodiment of the present invention. FIGS. 1 to 3 are schematic diagrams of the ferrule holder according to the first embodiment. FIG. 1 is an exploded view, FIG. 2 is a front view, and FIG. 3 is a partial section side view of the ferrule holder. As shown in FIGS. 1 to 3, a ferrule holder 30 includes a holder body 31, a holding unit 32, a stem 33, and a tube-shaped fixing member 34.

The holder body 31 includes a central portion 31c that has substantially the same outer diameter as that of a cylindrical portion of a ferrule to be held, and a tip 31a and a rear end 31b having a diameter smaller than that of the central portion 31c. An outer diameter of the tip 31a is formed slightly smaller than that of the cylindrical portion of the ferrule to be held.

The holding unit 32 that is made of an elastic material is cylindrically formed to have a slit 32a in a longitudinal direction and an inner diameter slightly smaller than the outer diameter of the cylindrical portion of the ferrule to be held. The stem 33 is constituted of a string that has much flexibility or a rod that has no flexibility. The fixing member 34 is formed to have an inner diameter slightly smaller than an outer diameter of the central portion 31c of the holder body 31.

The ferrule holder 30 can be assembled by inserting the stem 33 into a hole formed in the rear end 31b of the holder body 31, fixing the stem 33 by a method of caulking the rear end 31b or applying an adhesive into the hole, fitting one end of the holding unit 32 over the tip 31a of the holder body 31, and fixing the holding unit 32 and the holder body 31 in an integrated manner by covering the fixing member 34 on at least the fitted portion.

When the cylindrical portion of the ferrule to be held is inserted into a tip 32b of the holding unit 32, an inner diameter of the holding unit 32 made of an elastic material in which the slit 32a is formed is slightly enlarged to generate a repulsive force, thereby enabling the ferrule holder 30 to mechanically hold the ferrule. The stem 33 is extended on the opposite side of the holding unit 32 in the ferrule holder 30 and is constituted to easily hold the ferrule holder 30.

As an example of each of the above components, the holder body 31 is made of a soft material such as Teflon®. The tip 31a is 2.4 millimeters in outer diameter, the central portion 31c is 3 millimeters in outer diameter, and the rear end 31b is 2 millimeters in outer diameter. The holding unit 32 is made of a spring or the like with 11 millimeters in length, 2.4 millimeters in inner diameter, and 3 millimeters in outer diameter. The stem 33 is made of a material, such as wire, piano wire, an optical fiber, with outer diameter in the order of 0.9 millimeters and length in the order of 20 centimeters. The fixing member 34 is formed of a heat shrinkable tube with inner diameter in the order of 3 millimeters and outer diameter in the order of 4 millimeters. As the holding unit 32, a separating sleeve used for a connection adaptor of an optical connector can be used.

Each component is arranged in a heating chamber of a fusion-spliced-portion reinforcing device when reinforcing the fusion-spliced portion. Thus, in a device in which a heat shrinkable tube is heated in the fusion-spliced-portion reinforcing device, each component is required to be made of a material capable of resisting a temperature of 230° C. that is a heating temperature in the fusion-spliced-portion reinforcing device 23.

By use of the ferrule holder 30 according to the first embodiment, it is possible to easily transfer the ferrule fusion-spliced with an optical fiber to the fusion-spliced-portion reinforcing device and reinforce the fusion-spliced portion in a good condition. An explanation is given below about a ferrule transfer method by use of the ferrule holder according to the first embodiment, as a second embodiment of the present invention.

Second Embodiment

Figure 4:
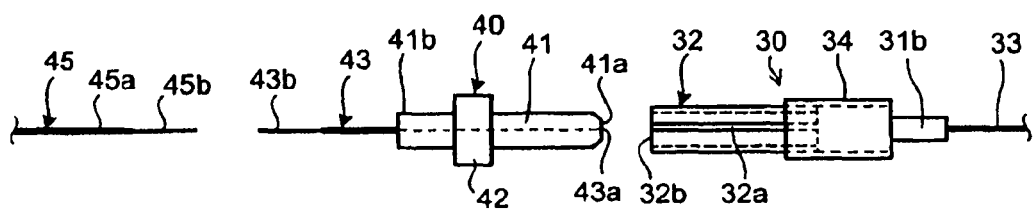
FIG. 4 is a schematic diagram illustrating a step of fusion splicing between a ferrule and a splicing optical fiber.

FIGS. 4 to 7 are schematic diagrams illustrating a step of a fusion-splicing between a ferrule and a splicing optical fiber, which is a step before a ferrule transfer method according to the second embodiment. As shown in FIG. 4, the ferrule holder 30 according to the first embodiment, a ferrule 40 with a built-in optical fiber, and a splicing optical fiber 45 are prepared. The ferrule 40 is arranged in such a manner that one end 43a of a built-in optical fiber 43 matches a splicing end 41a of its cylindrical portion 41 and a bare optical fiber portion 43b that is the other end of the built-in optical fiber 43 is protruded from a ferrule end 41b on the opposite side of the splicing end 41a. The ferrule 40 includes a guard 42 to fix the ferrule 40 to a housing of an optical connector. The ferrule 40 is similar to a conventional ferrule 11 shown in FIG. 19. The splicing optical fiber 45 is an optical fiber to be spliced to the built-in optical fiber 43, a coating 45a is removed on one end of the splicing optical fiber 45, and a bare optical fiber portion 45b is exposed in the same way as a conventional optical fiber core 14 shown in FIG. 20.

Figure 5:
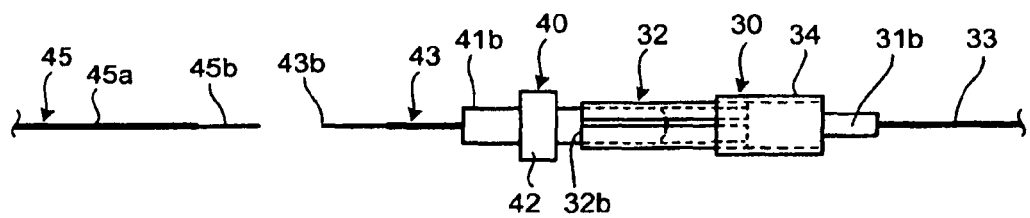
FIG. 5 is a schematic diagram illustrating a step of fusion splicing between the ferrule and the splicing optical fiber.

As shown in FIG. 5, the cylindrical portion 41 of the ferrule 40 is inserted into the tip 32b of the holding unit 32 of the ferrule holder 30, and the inner diameter of the holding unit 32 is being enlarged and the holding unit 32 is fitted over the cylindrical portion 41 of the ferrule 40. As a result, the holding unit 32 mechanically holds the ferrule 40 by a repulsive force generated by its enlarged inner diameter. The holder body 31 is made of a soft material such as Teflon®, so that even if the end 43a of the built-in optical fiber 43 butts the holder body 31 in an inserting operation, it is possible to prevent the end 43a from being damaged.

Figure 6:
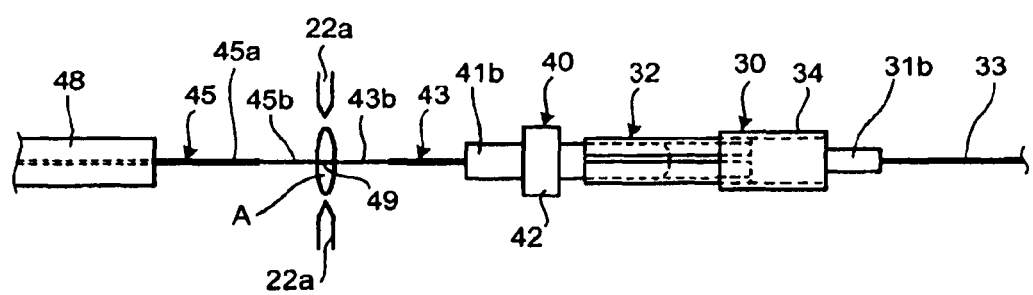
FIG. 6 is a schematic diagram illustrating a step of fusion splicing between the ferrule and the splicing optical fiber.

The ferrule 40 that is mechanically held by the holding unit 32 and the splicing optical fiber 45 are arranged in the fusion-splicing operation unit 22 of the conventional fusion-splicing device 21 shown in FIG. 23 in such a manner that an end of the bare optical fiber portion 43b of the built-in optical fiber 43 in the ferrule 40 and an end of the bare optical fiber portion 45b of the splicing optical fiber 45 face each other. The splicing optical fiber 45 is previously inserted into a heat-shrinkable reinforcing body 48. As shown in FIG. 6, the end of the bare optical fiber portion 43b and the end of the bare optical fiber portion 45b are fusion-spliced through an arc discharge A generated from the discharging electrodes 22a of the fusion-splicing device 21.

Figure 7:
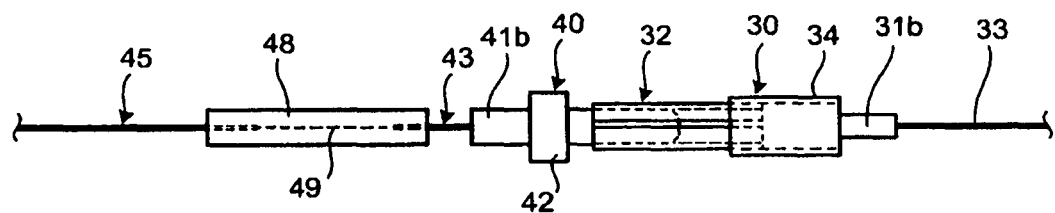
FIG. 7 is a schematic diagram illustrating a step of fusion splicing between the ferrule and the splicing optical fiber.

As shown in FIG. 7, the reinforcing body 48 is moved to include and involve the bare optical fiber portions 43b, 45b and a fusion-spliced portion 49, and the ferrule 40 together with the splicing optical fiber 45 are transferred to the fusion-spliced-portion reinforcing device 23.

Figure 8:
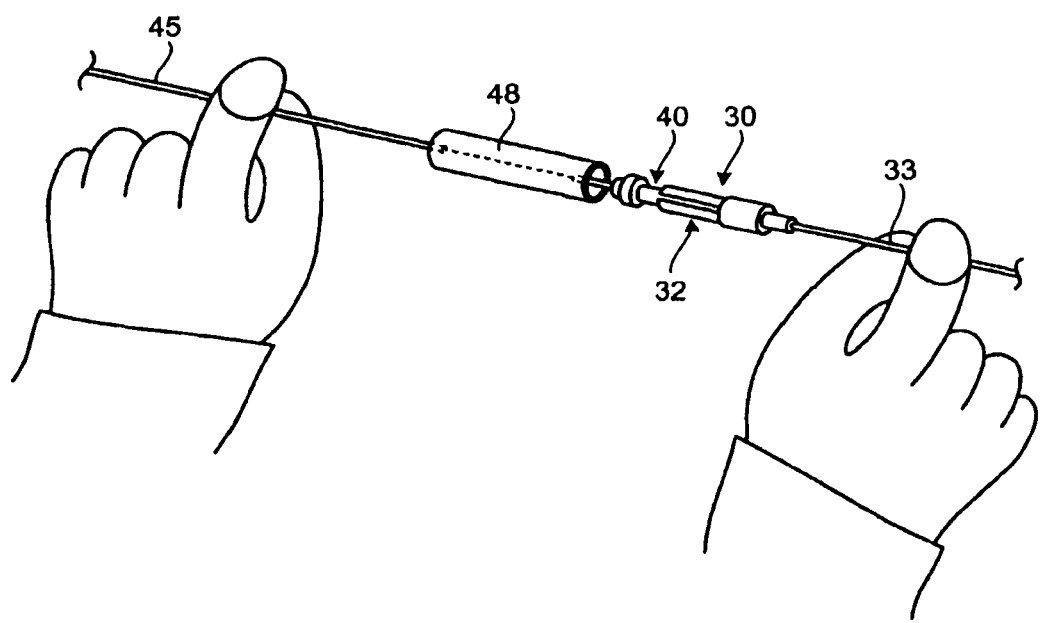
FIG. 8 is a schematic diagram illustrating how a ferrule is transferred according to a second embodiment of the present invention.

As shown in FIG. 8, in the ferrule transfer method according to the second embodiment, the splicing optical fiber 45 and the stem 33 of the ferrule holder 30 that holds the ferrule 40 are held to transfer the ferrule 40. As a result, compared with a conventional method, it is possible to easily transfer the ferrule 40 and stably house it in the heating chamber 23a of the fusion-spliced-portion reinforcing device 23.

Then, the reinforcing body 48 is heated in the heating chamber 23a of the fusion-spliced-portion reinforcing device 23 and is subject to heat shrinkage. The fusion-spliced portion 49 and the bare optical fiber portions 43b, 45b are covered by the reinforcing body 48 in a good condition. As a result, the fusion-spliced portion 49 is reinforced well and becomes more reliable.

Figure 9:
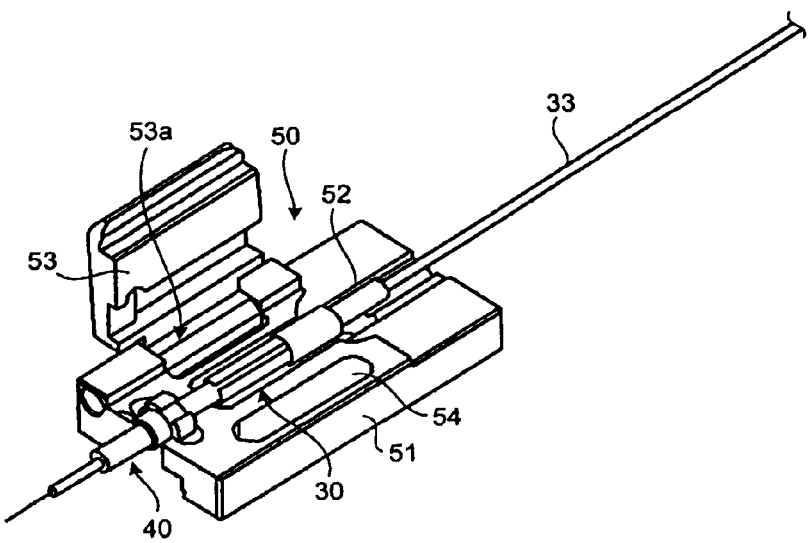
FIG. 9 is a schematic perspective view of a ferrule holder as an example in which the ferrule and the ferrule holder are placed.

According to the second embodiment, when performing a fusion-splicing by use of the fusion-splicing device 21 shown in FIG. 23, the fusion splicing is performed by replacing one of optical fiber holders H with a ferrule holder 50. FIG. 9 is a schematic perspective view of an example of the ferrule holder 50 while the ferrule and the ferrule holder are placed thereon.

The ferrule holder 50 includes a holder base 51 that has a bottom shape and a dimension that are long and wide enough to be set in the fusion-splicing device 21 instead of the optical fiber holder H. A groove 52 in which the ferrule holder 30 and the ferrule 40 held by the ferrule holder 30 can be arranged and fixed is formed on an upper surface of the holder base 51. A metal lid 53 that is rotatably fixed through a hinge mechanism 53a is arranged on a side of the holder base 51 and covers the ferrule 40 and the ferrule holder 30 that are placed on the groove 52. The metal lid 53 can be fixed by use of a magnetic force of a magnet 54 arranged in the holder base. As shown in FIG. 9, the ferrule 40 is placed in the ferrule holder 50, which is set at a holder arranging position in the fusion-splicing operation unit 22 of the fusion-splicing device 21. This makes it possible to reliably arrange the ferrule 40 in the fusion-splicing operation unit 22 of the fusion-splicing device 21.

The ferrule holder 30 includes, as described above, the stem 33 at one end and the holding unit 32 at the other end that holds the cylindrical portion 41 of the ferrule 40. Therefore, when the built-in optical fiber 43 and the splicing optical fiber 45 are fusion-spliced, it is different from a conventional operation of fusion-splicing optical fibers in a fact that the ferrule 40 is placed in the ferrule holder 50 of the fusion-splicing device 21. However, by employing the stem 33 as one of optical fibers when fusion-splicing optical fibers, a conventional technology of transferring the fusion-spliced portion when fusion-splicing optical fibers can be applied as it is.

Third Embodiment

A specific explanation is given below about a ferrule transfer method according to a third embodiment of the present invention. The ferrule transfer method according to the third embodiment is different from the ferrule transfer method according to the second embodiment in a fact that a splicing optical fiber that is fusion-spliced with the ferrule and the stem of the ferrule holder that holds the ferrule are held by use of a transfer arm to transfer the ferrule.

Figure 10:
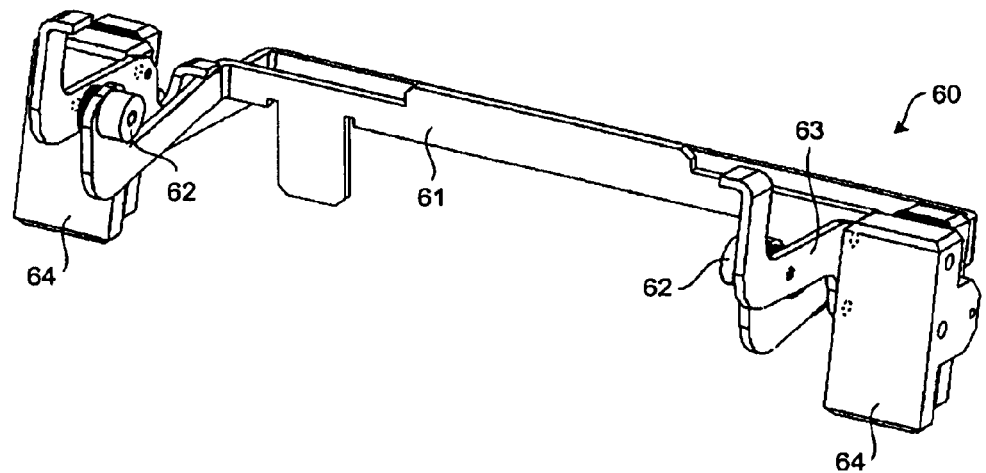
FIG. 10 is a schematic view of a transfer arm used in a third embodiment of the present invention.
Figure 14:
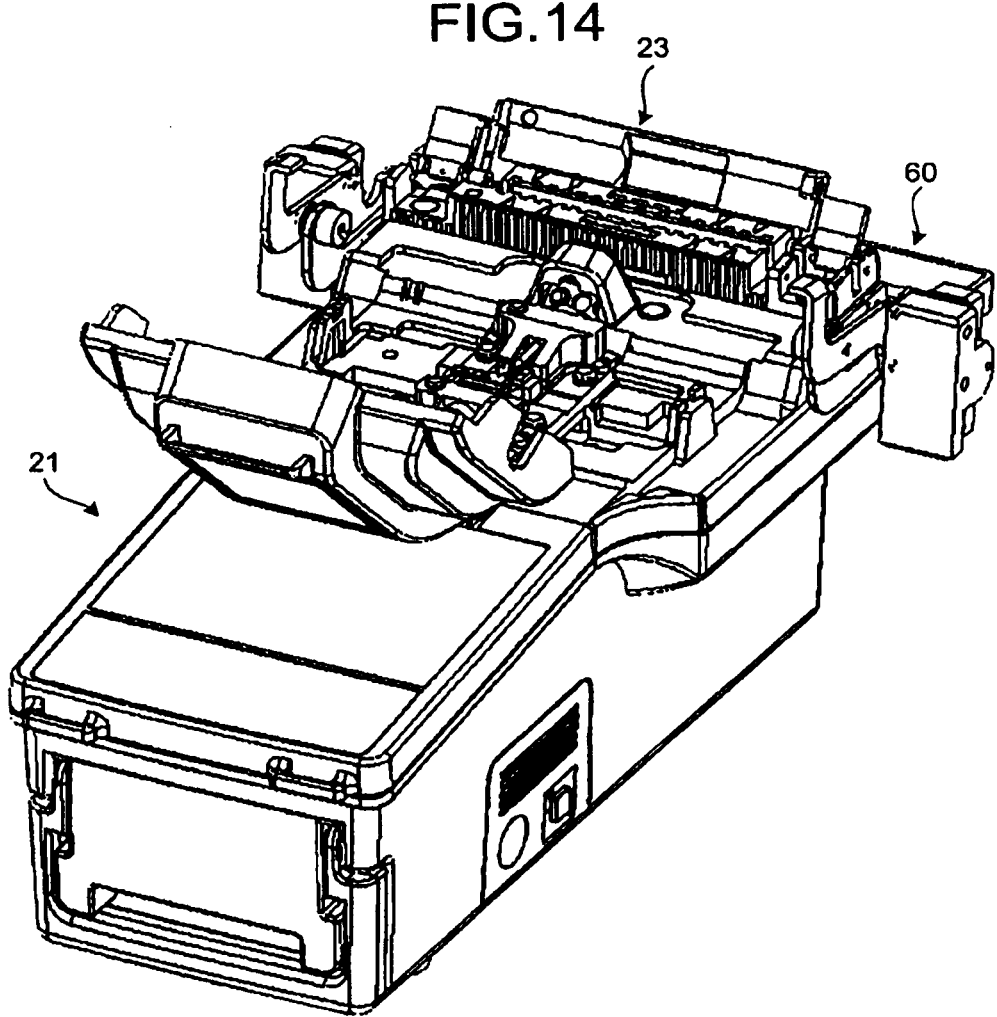
FIG. 14 is a perspective view for explaining how the transfer arm used in the third embodiment is mounted on a fusion-splicing device.

FIG. 10 is a schematic view of a transfer arm 60 used in the third embodiment. As shown in FIG. 10, the transfer arm 60 includes a fixing arm 61, rotation shaft supporting units 62, 62 arranged at both ends of the fixing arm 61, a movable arm 63 that can be rotated about the rotation shaft supporting units 62, 62, and pinching units 64, 64 which are arranged respectively at both ends of the movable arm 63. As shown in FIG. 14, the transfer arm 60 is mounted on top of the fusion-splicing device 21 by fixing the fixing arm 61 on a back surface of the fusion-spliced-portion reinforcing device 23.

An explanation is given below about the ferrule transfer method by use of the transfer arm 60 with reference to FIGS. 10 to 13. As shown in FIG. 10, the movable arm 63 is first rotated and is moved to the same side of the fixing arm 61 as if they are folded. Similarly to the case of the second embodiment, the ferrule 40 that is held by the ferrule holder 30 and the splicing optical fiber 45 are arranged in the fusion-splicing operation unit 22 of the fusion-splicing device 21 so that the end of the bare optical fiber portion 43b of the built-in optical fiber 43 in the ferrule 40 and the end of the bare optical fiber portion 45b of the splicing optical fiber 45 face each other. Then, the built-in optical fiber 43 and the splicing optical fiber 45 are fusion-spliced and bare optical fiber portions that include the fusion-spliced portion are covered by the reinforcing body 48.

Figure 11:
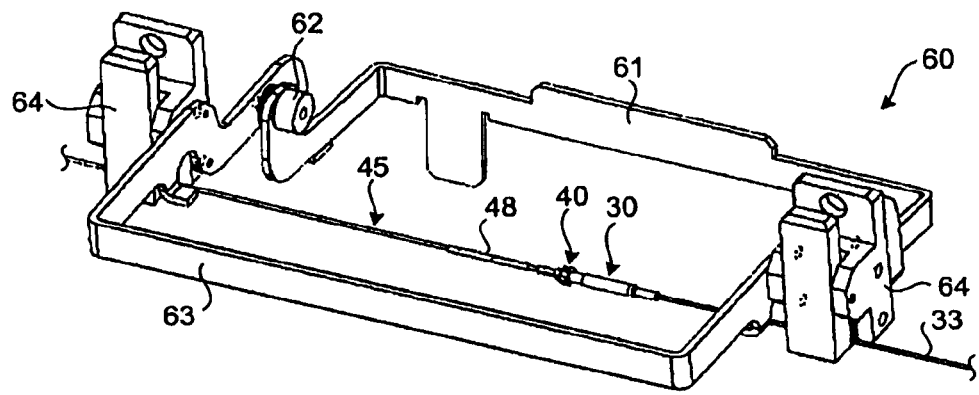
FIG. 11 is a schematic diagram illustrating a method of transferring the ferrule by use of the transfer arm shown in FIG. 10.

As shown in FIG. 11, the movable arm 63 is moved by a rotation to the side of the fusion-splicing operation unit 22 of the fusion-splicing device 21. One pinching unit 64 pinches the splicing optical fiber 45 and the other pinching unit 64 pinches the stem 33 of the ferrule holder 30.

Figure 12:
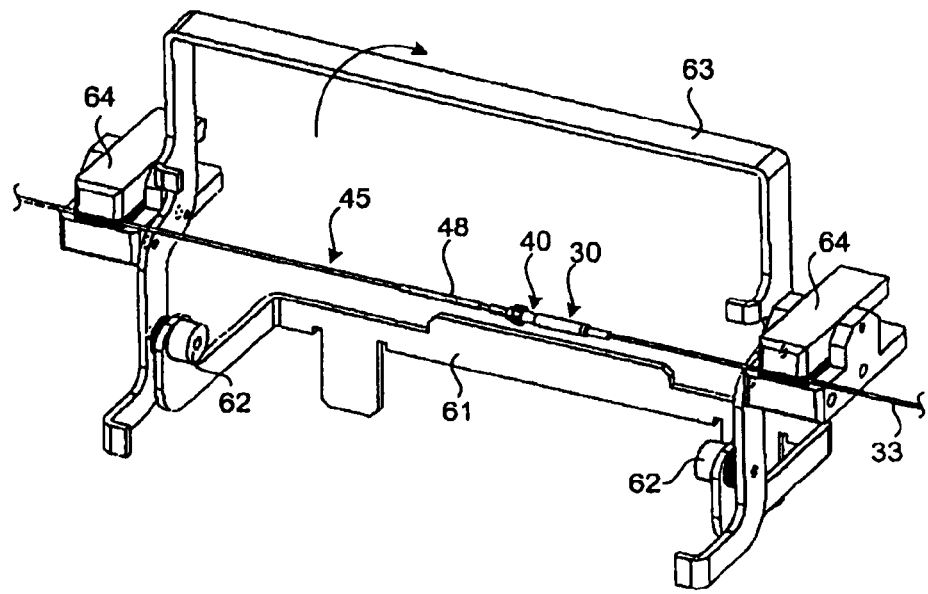
FIG. 12 is a schematic diagram illustrating a method of transferring the ferrule by use of the transfer arm shown in FIG. 10.
Figure 13:
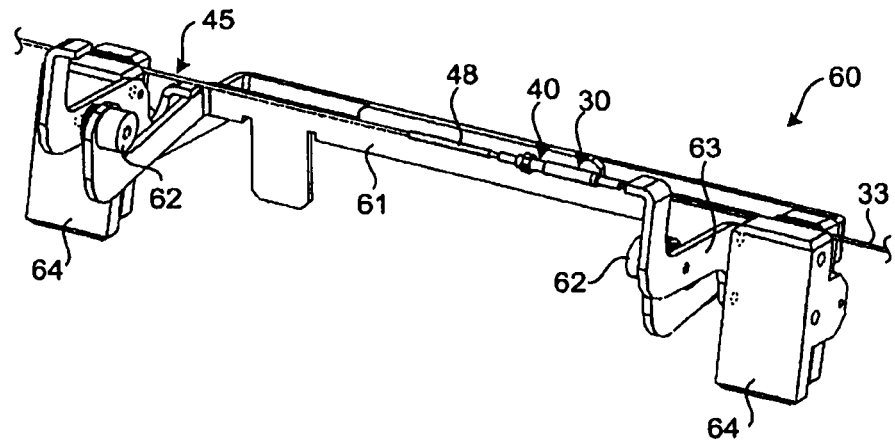
FIG. 13 is a schematic diagram illustrating a method of transferring the ferrule by use of the transfer arm shown in FIG. 10.

The movable arm 63 is half-rotated to pass through a condition shown in FIG. 12 to the side of the fixing arm 61 shown in FIG. 13. As a result, the ferrule 40 is transferred with the splicing optical fiber 45. While the movable arm 63 is half-rotated, the reinforcing body 48 is housed in the heating chamber 23a of the fusion-spliced-portion reinforcing device 23.

Holders 23b of the fusion-spliced-portion reinforcing device 23 hold the splicing optical fiber 45 and the stem 33 of the ferrule holder 30. Tension is exerted to the fusion-spliced portion 49 to operate the fusion-spliced-portion reinforcing device 23 and the fusion-spliced portion 49 is covered by the reinforcing body 48.

According to the third embodiment, the ferrule 40 is transferred by use of the transfer arm 60 so that the ferrule 40 can be easily transferred and the reinforcing body 48 can be reliably housed in the heating chamber 23a of the fusion-spliced-portion reinforcing device 23.

A heating temperature of the fusion-spliced-portion reinforcing device 23 is generally 230° C. in the second and the third embodiments. The ferrule 40 is housed in the heating chamber 23a so that there is a likelihood that an adhesive to fix the inserted built-in optical fiber 43 in the ferrule 40 may melt. In that case, it is preferable that the temperature of the heating chamber 23a is a temperature or more for the reinforcing body 48 to become heat-shrinkable and a temperature or less for an adhesive to melt, for example, 120° C. to 160° C.

When the holding unit 32 of the ferrule holder 30 is made of a heat-resisting material such as a ceramic in the first embodiment, it is preferably possible to prevent the ferrule 40 in the heating chamber 23a from increasing in temperature and an adhesive from melting.

The ferrule holder according to the present invention is not limited to the first embodiment and can be implemented in various aspects. The other aspects of the ferrule holder are explained below.

Figure 15:
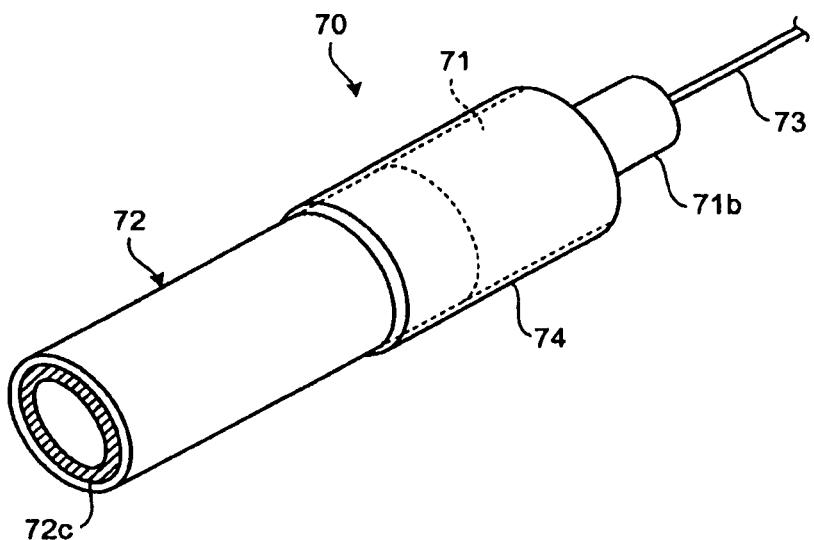
FIG. 15 is a schematic perspective view of a ferrule holder according to another embodiment of the present invention.

For example, as shown in a perspective view of FIG. 15, a ferrule holder 70 includes a holder body 71, a cylindrical holding unit 72 on which a slit is not formed, a stem 73 that is arranged at a rear end 71b of the holder body 71, and a fixing member 74. The ferrule holder 70 can be made as follows. An inner diameter of the holding unit 72 is larger than the outer diameter of the cylindrical portion of the ferrule. A layer-shaped elastic member 72c is mounted on an inner wall of the holding unit 72. A hole is made by the layer-shaped elastic member 72c to have a slightly smaller inner diameter than the outer diameter of the cylindrical portion of the ferrule. The ferrule holder 70 can hold the ferrule while the layer-shaped elastic member 72c presses an outer periphery of the cylindrical portion of the ferrule. Therefore, it is possible to mechanically hold the ferrule with an appropriate force without forming a slit on the holding unit 72.

Figure 16:
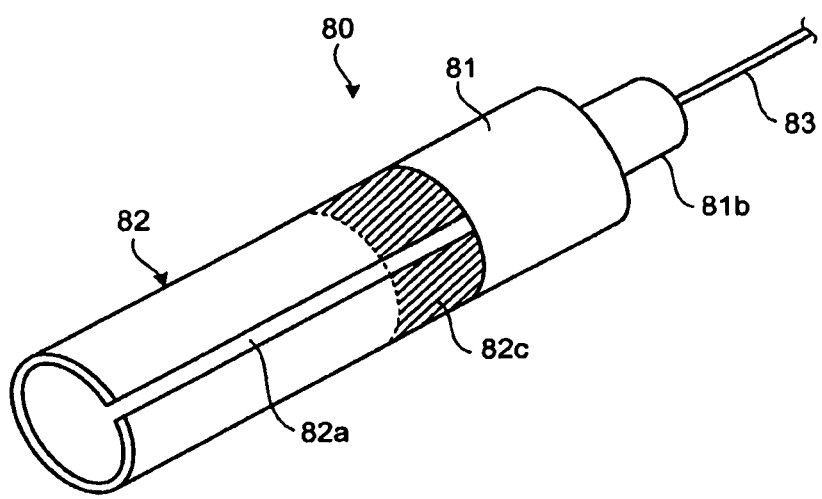
FIG. 16 is a schematic perspective view of a ferrule holder according to still another embodiment of the present invention.

In addition, as shown in a perspective view of FIG. 16, a ferrule holder 80 includes a holder body 81, a holding unit 82 on which a slit 82a is formed, and a stem 83 arranged at a rear end 81b of the holder body 81. The holding unit 82 can be caulked by a caulking unit 82c and fixed at a front end (not shown) of the holder body 81 in the ferrule holder 80. It is possible to reduce the number of components in the ferrule holder 80 because a fixing member to fix the holding unit 82 to the holder body 81 is not required. With its easy assembly, the ferrule holder 80 is hardly affected by heat.

Figure 17:
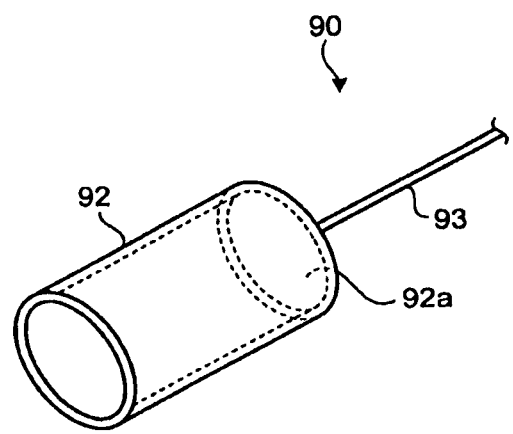
FIG. 17 is a schematic perspective view of a ferrule holder according to still another embodiment of the present invention.

As shown in a perspective view of FIG. 17, a ferrule holder 90 includes a lid-shaped holding unit 92 that has a slightly smaller inner diameter than the outer diameter of the cylindrical portion of the ferrule and a string-shaped stem 93. The string-shaped stem 93 is inserted into a hole (not shown) formed in a lid 92a of the lid-shaped holding unit 92 and is fixed by a method of running an adhesive into the hole. The ferrule holder 90 can be manufactured at a low price by using a ferrule protection cap that is made of elastic materials such as plastic, PVC, rubber, or the like and that is attached to a commercially available optical connector. It is preferable that the ferrule holder 90 functions as a protection cap for a ferrule before and after a fusion splicing operation.

Figure 18:
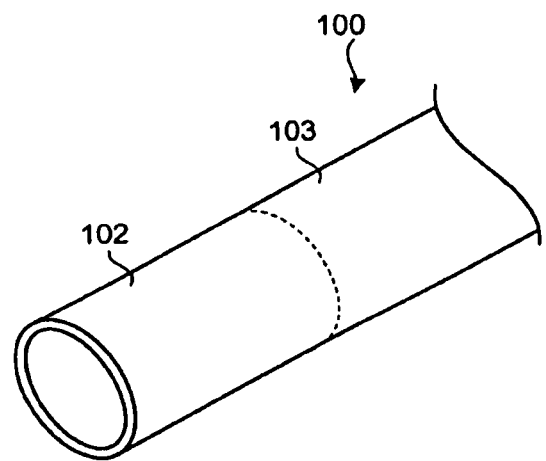
FIG. 18 is a schematic perspective view of a ferrule holder according to still another embodiment of the present invention.

As shown in a perspective view of FIG. 18, a ferrule holder 100 can be formed in such a manner that a holding unit 102 and a stem 103 are integrally formed of a tube that has a slightly smaller inner diameter than the outer diameter of the ferrule the ferrule holder holds. The ferrule holder 100 has a low component count and is inexpensive. A material of the tube can be, but are not particularly limited to, ones that do not degrade due to a heating temperature in the fusion-spliced portion. PVC, rubber, heat-shrinkable materials, or the like are used. If the stem 103 of the tube that constitutes the ferrule holder 100 is crushed, the crushed stem is preferable because it is hard to become caught by a windshield cover of the fusion-splicing device.

As described above, the ferrule transfer method and the ferrule holder according to the present invention are preferably used when the ferrule with a built-in optical fiber that is fusion-spliced with an optical fiber is transferred to the fusion-spliced portion.

Additional effects and modified examples can be easily led by those skilled in the art. Therefore, a broader aspect of the present invention is not limited to specific details and representative embodiments that are represented and described above. Hence, various modifications can be made without departing from a spirit or a scope of a comprehensive concept of the invention that is defined by attached claims and their equivalents.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of making a fusion-spliced optical fiber, comprising:
    holding a ferrule in one end of a holding element, said holding element having a stem extending from the other end thereof, said ferrule disposed around a built-in optical fiber segment, said built-in optical fiber segment having an exposed end that extends from said ferrule;
    receiving said holding element in a ferrule holding element of a fusion-splicing device;
    fusion-splicing said exposed end of said built-in optical fiber segment to an end of another optical fiber to form a spliced portion; and
    transferring said spliced portion by supporting at least said stem, wherein
    the stem is disposed at the ferrule holding element so that the stem is protruded from one side, of the ferrule holding element, opposite to the built-in optical fiber segment, and
    the fusion-splicing device includes a fusion-splicing unit and a discharge electrode, the fusion-splicing unit including an optical fiber holder and the ferrule holding element, the optical fiber holder causing the exposed end of the built-in optical fiber segment and the end of the another optical fiber to face each other and disposing and fixing the facing ends, and the discharge electrode causing an arc discharge for fusion-splicing the facing ends of the built-in optical fiber segment and the another optical fiber.

2. The method of claim 1, further comprising:
    reinforcing the spliced portion after said spliced portion was transferred in said transferring step, wherein
    the fusion-splicing device includes a fusion-spliced-portion reinforcing unit, and
    in said transferring step, the fusion-splicing unit is transferred to the fusion-spliced-portion reinforcing unit.

3. The method of claim 2, wherein said reinforcing step is performed in a different portion than where said fusion-splicing is performed.

4. The method of claim 2, further comprising:
    disposing a tube about said spliced portion.

5. The method of claim 4, further comprising:
    heat shrinking said tube on said spliced portion.

6. The method of claim 1, further comprising:
    after said fusion-splicing step, removing said holding element from the ferrule-holding element of the fusion-splicing device.

7. The method of claim 1, wherein:
    said transferring step includes manually grasping said stem.

8. The method of claim 1, further comprising:
    disposing said ferrule in a connector.

9. The method of claim 1, wherein the diameter of the stem is smaller than all diameters of the ferrule.

10. A method of making a fusion-spliced optical fiber, comprising:

holding a ferrule in one end of a holding element, said holding element having a stem extending from the other end thereof, said ferrule disposed around an optical fiber segment, said optical fiber segment having an exposed end that extends from said ferrule;

receiving said holding element in a ferrule holding element of a fusion-splicing device;

fusion-splicing said exposed end of said optical fiber segment to an end of another optical fiber to form a spliced portion; and transferring said spliced portion by supporting at least said stem, wherein said transferring step includes manually grasping said stem, and the diameter of the stem is smaller than all diameters of the ferrule.

* * * * *